US008700672B2

(12) United States Patent
Bae (10) Patent No.: US 8,700,672 B2
(45) Date of Patent: Apr. 15, 2014

(54) METHOD OF PROCESSING TAG INFORMATION AND CLIENT-SERVER SYSTEM USING THE METHOD

(75) Inventor: Sung-cheol Bae, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 884 days.

(21) Appl. No.: 12/287,739

(22) Filed: Oct. 14, 2008

(65) Prior Publication Data

US 2009/0106279 A1    Apr. 23, 2009

(30) Foreign Application Priority Data

Oct. 18, 2007 (KR) .......................... 10-2007-0105032

(51) Int. Cl.
*G06F 3/048* (2013.01)
*G06F 17/30* (2006.01)

(52) U.S. Cl.
USPC .......................................... 707/796; 715/764

(58) Field of Classification Search
CPC ................... G06F 17/30038; G06F 17/30206; G06F 17/30274; G06F 17/30265; G06F 17/3028; G06F 17/3089; G06F 2216/17; G06F 17/30017; G06F 17/30056; G06F 17/30064; G06K 9/00677; H04L 29/08306; H04N 1/2183; H04N 1/32101; H04N 2201/32
USPC .............................. 707/754, 795, 796; 715/764
See application file for complete search history.

(56) References Cited

U.S. PATENT DOCUMENTS

| | | | |
|---|---|---|---|
| 7,565,360 B2 * | 7/2009 | Grizzard ............................. 1/1 |
| 8,347,231 B2 * | 1/2013 | Stephens ...................... 715/833 |
| 2003/0033296 A1 * | 2/2003 | Rothmuller et al. .............. 707/3 |
| 2003/0063770 A1 * | 4/2003 | Svendsen et al. ............. 382/100 |
| 2004/0230966 A1 * | 11/2004 | Morris et al. ................. 717/169 |
| 2005/0246374 A1 * | 11/2005 | Blinn et al. ................. 707/104.1 |
| 2006/0031089 A1 * | 2/2006 | Tarr et al. ........................... 705/1 |
| 2006/0242139 A1 | 10/2006 | Butterfield et al. |
| 2007/0097421 A1 * | 5/2007 | Sorensen et al. ............. 358/1.15 |
| 2007/0208776 A1 * | 9/2007 | Perry et al. ................. 707/104.1 |
| 2008/0201645 A1 * | 8/2008 | Francis et al. ................ 715/742 |

OTHER PUBLICATIONS

"Welcome to Flickr—Photo Sharing," Web page, retrieved from internet website: http://flickr.com on Oct. 19, 2011.

* cited by examiner

*Primary Examiner* — Jorge A Casanova
(74) *Attorney, Agent, or Firm* — Drinker Biddle & Reath LLP (57) ABSTRACT

A method of processing tag information includes displaying a web page for designating media contents to be uploaded on a screen of the client terminal; receiving tag information on the media contents to be uploaded through the web page; converting the received tag information into metadata; storing the metadata in a local storage area of the client terminal; and storing the metadata in a storage area of a web server. Also provided is a client-server system using the method. Accordingly, the tag information, which provides additional information associated with multimedia contents, can be managed at a local area and on a web connected to the local area through the communication network. Also, a user environment in which the tag information can be applied in a useable way at the local area is provided. The tag information is added to the multimedia contents stored in the local area, so that it is not necessary to manually input the tag information each time the contents are uploaded.

13 Claims, 6 Drawing Sheets

FIG. 1

| | |
|---|---|
| Date Time | 2007:04:23 17:10:20 |
| Exposure Time | 1/45 Sec |
| FNumber | F3.5 |
| ISO | 200 |
| Focal Length | 6.60 mm |
| Flash | Not fired |
| Exposure Mode | Auto |
| White Balance | Auto |
| Focal Length(35mm) | 37° |
| TAG INFORMATION | FRANCE PARIS EIFFEL TOWER |
| | |
| | |
| Thumbnail image | |
| Main Image | |

M1 covers the rows from Date Time through Focal Length(35mm).
M2 covers the TAG INFORMATION row.

METHOD OF PROCESSING TAG INFORMATION AND CLIENT-SERVER SYSTEM USING THE METHOD

CROSS-REFERENCE TO RELATED PATENT APPLICATION

This application claims the benefit of Korean Patent Application No. 10-2007-0105032, filed on Oct. 18, 2007 in the Korean Intellectual Property Office, the entire contents of which is incorporated herein by reference.

BACKGROUND OF THE INVENTION

1. Field of the Invention

The present invention relates to a method of processing tag information. More particularly, the present invention relates to a method of processing tag information to generate, store, and display the tag information which provides additional information associated with multimedia content, on the local area and on the World Wide Web through a communication network.

2. Description of the Related Art

As storage capacities of digital devices increase and multimedia compression technologies have developed, a capacity of the amount of multimedia that can be stored in such digital devices has rapidly increased. In addition, as web-based content processing technologies have developed and data rates in communication networks have increased, such digital devices can be connected to each other in a network in order to share data. Also, the amount of shared multimedia has greatly increased. The World Wide Web enables sets of information sources including multimedia contents in various formats associated with a very wide variety of subjects to be shared between a number of users connected through a communication network. Accordingly, an ability of a user to search for and extract contents associated with a particular subject or distinguish contents associated with the user's preferences and tastes becomes important. In addition, in terms of web server management, base information that can effectively classify a very large amount of contents uploaded from a local area through the communication network is required, tools for rapidly and effectively browsing a very large amount of contents managed in a web-space for users are required, and highly reliable technical methods of selecting/extracting contents associated with a search request from a user are required. Recently, technology involving the generation of metadata for additional information associated with multimedia content and adding the metadata to the corresponding content has been proposed. In this case, the metadata is managed on a web level but cannot be managed at a local area level.

SUMMARY OF THE INVENTION

The present invention provides a method of processing tag information, and a client-server system using the method, in which tag information, which provides additional information associated with multimedia contents, can be managed at a local area and on a web server connected to the local area through a communication network, and a user environment in which the tag information can be applied in a useable way at the local area, and the tag information is added to the multimedia contents stored at the local area, so that it is not necessary to manually input the tag information each time the contents are uploaded.

According to an embodiment of the present invention, a method of processing tag information is provided. The method includes: displaying a web page for designating media contents to be uploaded on a screen of the client terminal; receiving tag information on the media contents to be uploaded through the web page; converting the received tag information into metadata; storing the metadata in a local storage area of the client terminal; and storing the metadata in a storage area of a web server.

In the above-described embodiment of the present invention, the storing of the metadata in the storage area of the web server may include storing the metadata in a designated data field of a corresponding media contents file, or forming a relationship between the metadata and the corresponding media contents file to store the metadata in an additional database which is separated from the media contents file.

In addition, the storing of the metadata in the local storage area may include storing the metadata in a designated data field of a corresponding media contents file, or forming a relationship between the metadata and the corresponding media contents file to store the metadata in an additional database which is separated from the media contents file.

According to another embodiment of the present invention, a method of processing tag information is provided that includes: displaying a web page for designating media contents to be uploaded on a screen of the client terminal; and displaying existing tag information extracted from the media contents to be uploaded in addition to a name or an image of the media contents on the web page; receiving new tag information on the media contents to be uploaded through the web page; converting the received tag information into metadata; storing the metadata in a local storage area of the client terminal; and storing the metadata in a storage area of a web server.

In the above-described embodiment of the present invention, the storing of the metadata in the storage area of the web server may include storing the metadata in a designated data field of a corresponding media contents file, or forming a relationship between the metadata and the corresponding media contents file to store the metadata in an additional database which is separated from the media contents file.

In addition, the storing of the metadata in the local storage area may include storing the metadata in a designated data field of a corresponding media contents file, or forming a relationship between the metadata and the corresponding media contents file to store the metadata in an additional database which is separated from the media contents file.

According to another embodiment of the present invention, there is provided a client-server system having a client terminal and a web server which are connected to each other through a communication network. The client terminal includes: a client application module which displays a web page for designating media contents to be uploaded on a screen of the client terminal and transmits media contents to be uploaded from a local storage area to the web server; and a client metadata processing module storing tag information input through the web page in the local storage area as metadata. The web server includes: a server application module which receives the media contents uploaded from the client terminal to store the media contents in the server area; and a server metadata processing module storing the tag information input through the web page in the server area as metadata.

In the above-described embodiment of the present invention, one of the client metadata processing module and the server metadata processing module may convert tag information input through the web page into metadata and may transmit the metadata to the other one.

In addition, the client metadata processing module may store the tag information in a designated data field of a corresponding media contents file, or may form a relationship between the tag information and the corresponding media contents file to store the tag information in an additional database separated from the media contents file.

In addition, the server metadata processing module may store the tag information in a designated data field of a corresponding media contents file, or may form a relationship between the tag information and the corresponding media contents file to store the tag information in an additional database separated from the media contents file.

BRIEF DESCRIPTION OF THE DRAWINGS

The above and other features and advantages of the present invention will become more apparent by describing in detail exemplary embodiments thereof with reference to the attached drawings in which:

FIG. 4, comprised of FIGS. 4A and 4B, is a flowchart illustrating an example of a method of inputting tag information in association with a method of uploading multimedia contents, according to an embodiment of the present invention.

DETAILED DESCRIPTION OF THE INVENTION

Hereinafter, exemplary embodiments of the present invention will be described in detail with reference to the attached drawings. In this description, metadata is used as a generic term for additional information associated with and provided to multimedia contents such as still images or videos for users.

Figure 1:
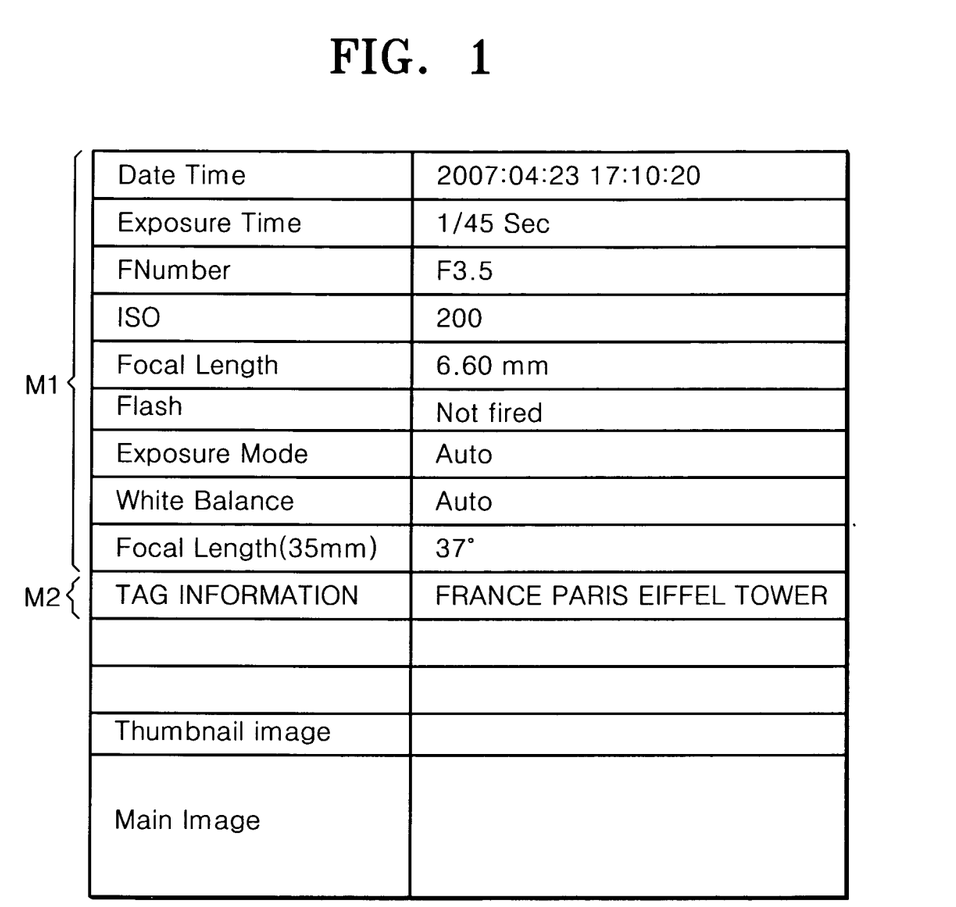
FIG. 1 is a view for explaining an example of a type of metadata, in this case, a data structure of a joint photographic experts group (JPEG) file format.

FIG. 1 is a view for explaining an example of a type of metadata, in this case, a schematic illustration of an example of a data structure of a joint photographic experts group (JPEG) file format that is generated by a digital camera, for example. The illustrated data structure of the image file includes metadata M1 and M2 at classified data fields of an exchangeable image file format (EXIF) header region, a thumbnail image region for storing a reduced-size of an image besides the header region, and a main image region for storing a main image. Referring to FIG. 1, the metadata M1, that is a first type of metadata, includes attribute information associated with image generation such as Date Time, Exposure Time, FNumber, ISO, Focal Length, Flash, Exposure Mode, White Balance, and the like, and the metadata M1 may be associated, for example, with reproducing conditions of its corresponding contents.

The metadata M2, that is a second type of metadata, is, for example, intentionally provided by a user. For example, tag information "FRANCE PARIS EIFFEL TOWER" in a type of a text written by the user for an image displayed on a web page is converted as metadata to be added to a corresponding content, for example, an image stored in a file. The metadata associated with the content is stored, for example, in a client terminal of a local area and a web server on a network. For example, as the metadata, header information may be recorded in the same file along with the content or separated from the content to be stored in an individual storage area outside the file such as a database. In this case, relationships between the content and the metadata can be maintained by using the same identifier therefor or by providing a cross-reference.

Figure 2:
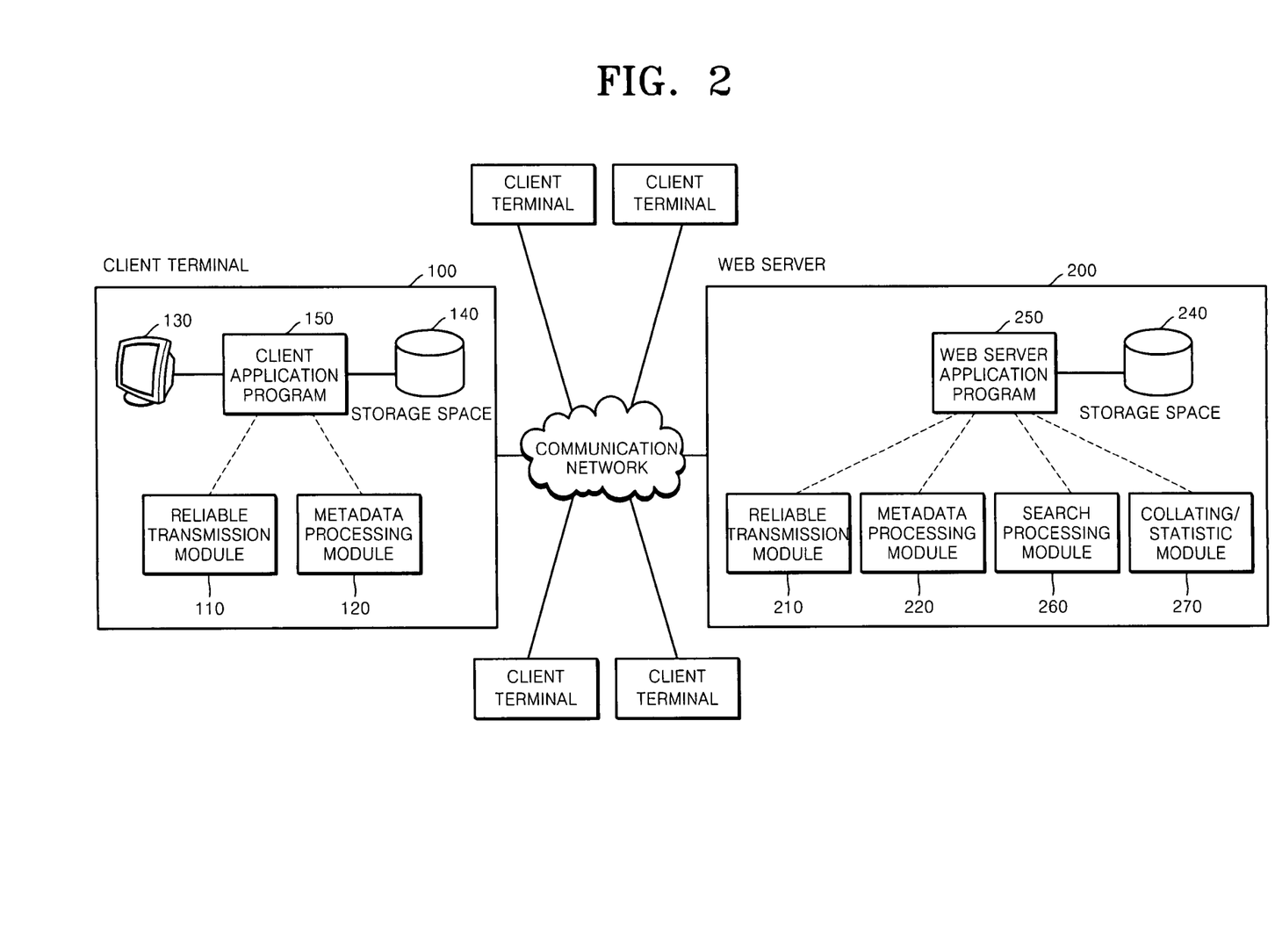
FIG. 2 is a functional block diagram of an example of a client-server system according to an embodiment of the present invention.

FIG. 2 is a functional block diagram illustrating an example of a client-server system according to an embodiment of the present invention. The client-server system of FIG. 2 includes a client terminal 100 and a web server 200 which are connected to each other through a communication network such as the Internet, for example, according to an embodiment of the present invention.

The client terminal 100 (which may sometimes be referred to as "the client") includes a storage space 140 for storing media contents and a display unit 130 for displaying a screen for a user. Examples of the client terminal 100 may include, for example, a computing device such as a desktop computer, a notebook, a personal digital assistant (PDA) and a digital camera, which can be directly or indirectly connected to the web server 200. The client terminal 100 accesses a particular web server with reference to a web site input by the user to request a start of a communication session, and processes and displays data received from the web server 200 as a web page. In addition, the client terminal 100 may transmit contents stored in the storage space 140 to the web server 200, or process and provide contents received from the web server 200 on the screen for the user.

For example, the client terminal 100 may include a reliable transmission module 110 implemented as a communication protocol such as the transmission control protocol/Internet protocol (TCP/IP) so as to provide reliable data transmission services between the client terminal 100 and the web server 200. The reliable transmission module 110 requests a service of the web server 200 to initialize a communication path. An application program 150 (referred to as application module) executed by the client terminal 100 includes control commands for each part of the client terminal 100 to process and display contents received from the web server 200 in the network on the screen for the user (referred to as download) and transmit the contents stored in the client terminal 100, that is, contents stored in the storage space 140, to the web server 200 (referred to as upload). The client terminal 100 associates tag information added to a content to be uploaded with the corresponding content to store the tag information in the storage space 140 of the client as metadata. To do this, the client terminal 100 may further include a metadata processing module 120. Details of generation and processing of the metadata are described later.

The web server 200 connected to the client terminal 100 through the communication network such as the Internet, for example, receives a service request message from the client and provides search results for user queries, data of a requested web page, media contents, and the like, for example, to the client terminal 100. For this processing, the web server 200 includes a reliable transmission module 210 for reliable data transmission with the client terminal 100, a database 240 for storing media contents to be transmitted to the client by the request of the user, and a search processing module 260 for returning the search results in response to the user queries. In addition, the web server 200 includes a metadata processing module 220 for managing processing operations associated with metadata such as an operation of calling and displaying metadata associated with a requested content on a web page. The metadata processing module 220 associates tag information provided from the user such as a summary of contents, an opinion, ratings of the user, and the like, for example, by associating the tag information with corresponding contents and stores the tag information in a storage space of the web server 200.

For example, the metadata processing module 220 converts the tag information input through a web page into new metadata contents, or adds the tag information to existing metadata. The metadata processing modules 120 and 220 implemented in the client terminal 100 and the web server 200, respectively, store the tag information provided from the user in the storage space of the web server 200 and also in the storage space 140 of the client terminal 100 at the same time. For example, the two metadata processing modules 120 and 220 cooperate with each other in that the metadata processing module 120 of the client generates new metadata from the tag information, and the metadata processing module 220 of the server receives the generated metadata.

In association with tag information writing, a data provider who uploads contents on a network directly may write summary information on a corresponding content and users who share contents through the communication network may write ratings or opinions about a corresponding content. Storing the tag information provided from the user in the storage space 140 of client terminal 100 in addition to the web server 200 considers an uploading status where an original content file to be provided on a web exists in the storage space 140 of the client terminal 100, for example, but is not limited thereto.

The search processing module 260 extracts associated metadata and displays the associated metadata on a web page, for example, in response to the user's query received from the client, according to a result of comparing a search string of the user's query with the metadata in the storage space of the web server 200. The web server 200 may further include a collating/statistic module 270 for examining preferences for the content of the user. The collating/statistic module 270 collates usage histories of individual contents by various users and applies a statistical method thereto to extract preferences for a corresponding content of the users. For example, the number of reproduction, a reproduction time, or the number of pieces of tag information provided from the users who share the content on the web are obtained, and a statistical function is applied thereto, so that numerical information on the preferences is output. For example, when an application program 250 (which sometimes may be referred to as an "application module") executed on the web displays the search results for the user's query or summary information on latest contents, in connection with the preference information output from the collating/statistic module 270, the application program changes a display pattern such as a ranking order, a font size, and the like, for example, so that information providing services based on the preferences can be provided.

Figure 3:
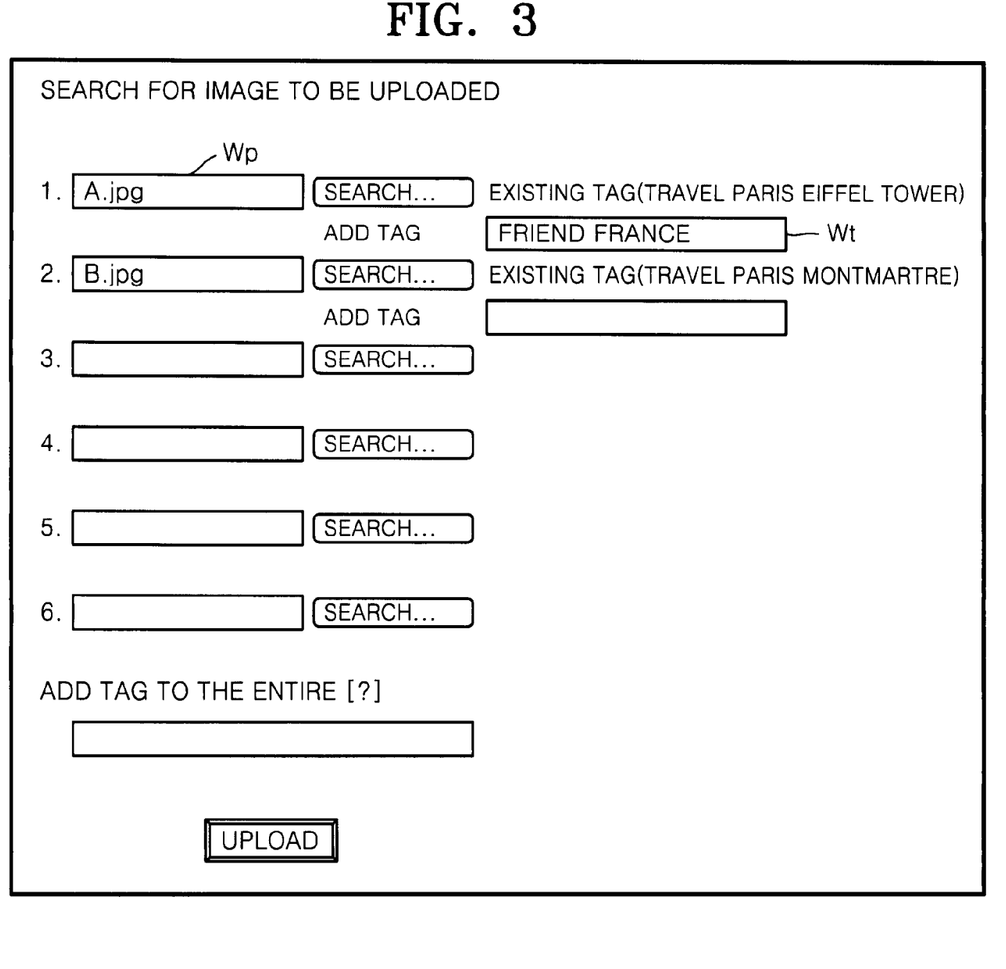
FIG. 3 is a view illustrating an example of an upload screen provided from a web server when multimedia contents at a local area are uploaded to the web server.

FIG. 3 is a view illustrating an example of an upload screen provided from a web server 200 when multimedia contents at a local area are uploaded to the web server 200. For example, FIG. 3 illustrates an example of a web page provided by the web server 200 when a file is uploaded on the web from the storage space 140 through a communication network such as the Internet. A corresponding web page provides an uploading function for a plurality of files, browsing the storage space 140 of the client terminal 100, and provides a "search" function for searching a file to be uploaded. Specifically, on the illustrated screen, the name of the file to be uploaded may be displayed in the rectangular windows Wp, for example, or a certain image showing contents of a file to be uploaded may be displayed instead of the file name. An icon "SEARCH" for searching for a file is disposed by each window Wp and the function "SEARCH" is used to show a hierarchical memory structure of the client terminal 100 so as to enable the user to indicate the file to be uploaded.

In addition, at the same line, or example, as the icon "SEARCH", existing tag information associated with the file to be uploaded is displayed. The existing tag information, for example, "TRAVEL PARIS EIFFEL TOWER" or "TRAVEL PARIS MONTMARTRE" may include a single letter associated with a corresponding content, a plurality of letters divided by characters, or sequences, for example. The user may add new tag information associated with the content to the existing tag information. For example, the user may input the words "FRIEND FRANCE" to an input window Wt in a shape of a box displayed on the screen to accumulate new tag information. For example, the added tag information along with the existing tag information may be converted into binary-coded metadata according to a final store command of the user performed by manipulating an "enter" key. The latest updated metadata is stored in the same file along with the corresponding content or in a database outside the file according to an embodiment of the client terminal 100.

On the web page illustrated in the example of FIG. 3, unique tag information may be added to each content item. However, a function of simultaneously adding the same tag information to a group of content items uploaded at the same time is also provided. For example, a plurality of pictures taken at the same travel location or a plurality of pictures taken at a single event may be uploaded on the web. In order to upload tag information on the travel location or the single event, for example, a function "ADD TAG TO THE ENTIRE" displayed at a lower portion of the screen is available to be used in order to simultaneously provide tag information to the entire set of content items instead of requiring the user to separately and manually input the same tag to each content item. This greatly improves the user's convenience in this regard.

In association with adding tag information, in addition to the data provider who uploads the contents, a plurality of users may add tag information to the contents which are set to be allowed to be accessed by normal members or members in a specific small group. Here, for example, according to content opening levels, only reading is allowed, adding tag information in addition to reading is allowed, or only reading is allowed for the normal members and adding tag information in addition to reading is allowed for members in a specific small group. As described previously, the content opening levels can be subdivided according to member levels and access authorities.

When the processes of indicating a file to be uploaded and adding tag information are completed, the file to be uploaded is transmitted to the web server 200 through the communication network according to a final upload request from the user. Here, the file to be uploaded stores the tag information to be transmitted to the web server 200. For example, a file to be uploaded of which transmission is started according to a manipulation signal of an icon "UPLOAD" on the web page illustrated in FIG. 3 is stored in the server area and managed on the web.

According to an embodiment of the present invention, the tag information added to the contents is managed on the web and by the client terminal 100 at the local area. Specifically, the tag information converted as metadata is associated with the contents, added to the storage area of the web server 200, and stored in the storage space 140 of the client terminal 100, for example. By attaching the tag information to the contents at the local area, registering the tag information whenever the contents are uploaded on a different web site can be avoided. Specifically, the metadata processing module 120 of the client terminal 100 converts the tag information added through the web page into metadata. Alternatively, the metadata processing module 120 receives metadata that is converted in advance from the web server 200. Thereafter, the metadata processing module 120 stores the received metadata in the same file along with the contents. Otherwise, for example, the metadata processing module 120 generates relationships between the metadata and the contents, separates the metadata from the contents, and stores the separated metadata in a database dedicated to metadata.

For example, a digital camera generally generates metadata and content at the same time. See M1 in FIG. 1, for example. More particularly, the digital camera simultaneously generates image data and metadata about photographing conditions such as date time, exposure time, flash, and the like. When the generated metadata exists, tag information added through a web page may be processed to be added to the existing metadata. On the other hand, tag information added to contents which do not include metadata, for example, contents that do not originally include metadata (ex, image data worked in the host computer) and contents de-associated with metadata may be processed to be generated as new metadata.

Tag information which implicitly represents a subject of a content can be usefully applied to search the content. Specifically, the search processing module 260 of the web server 200 which starts operating when a search string is input by the user, extracts tag information from the database 240 managed by the web server 200 or from files stored in the storage area managed by the web server 200, by using the input search string as a keyword, and search results having more than a critical matching ratio are displayed on the web page. For example, tag information matching with search conditions may be displayed on the web page as a type of text linking to contents, and the user clicks the tag information to directly access the linked contents.

In addition to being used effectively for a content search, the tag information can provide summary information on latest updated contents. For example, the web server 200 may display tag information on the latest contents uploaded so far from the last visit of a user, and the user checks the tag information that implicitly represent the contents to rapidly perceive the summary information and easily select contents according to preferences, tastes, and interests of the user. For example, when member information is checked on a user authentication screen and the user authentication screen is changed to a main screen, in association with displaying the tag information of the latest contents on the main screen, preferences of various users are collated in real-time and the tag information may be displayed in a pattern reflecting the preferences. Specifically, pieces of usage information on the number of accesses of the users, content reproduction time, and the like are collated, a ranking order for displaying the various pieces of tag information can be determined, or a font size of a text for representing the tag information can be adjusted, according to the preferences that are numerically expressed by applying the statistical function. Here, the tag information provided from users who are granted access to corresponding contents is quantitatively perceived, and preferences for the corresponding contents can be numerically expressed.

Figure 4A:
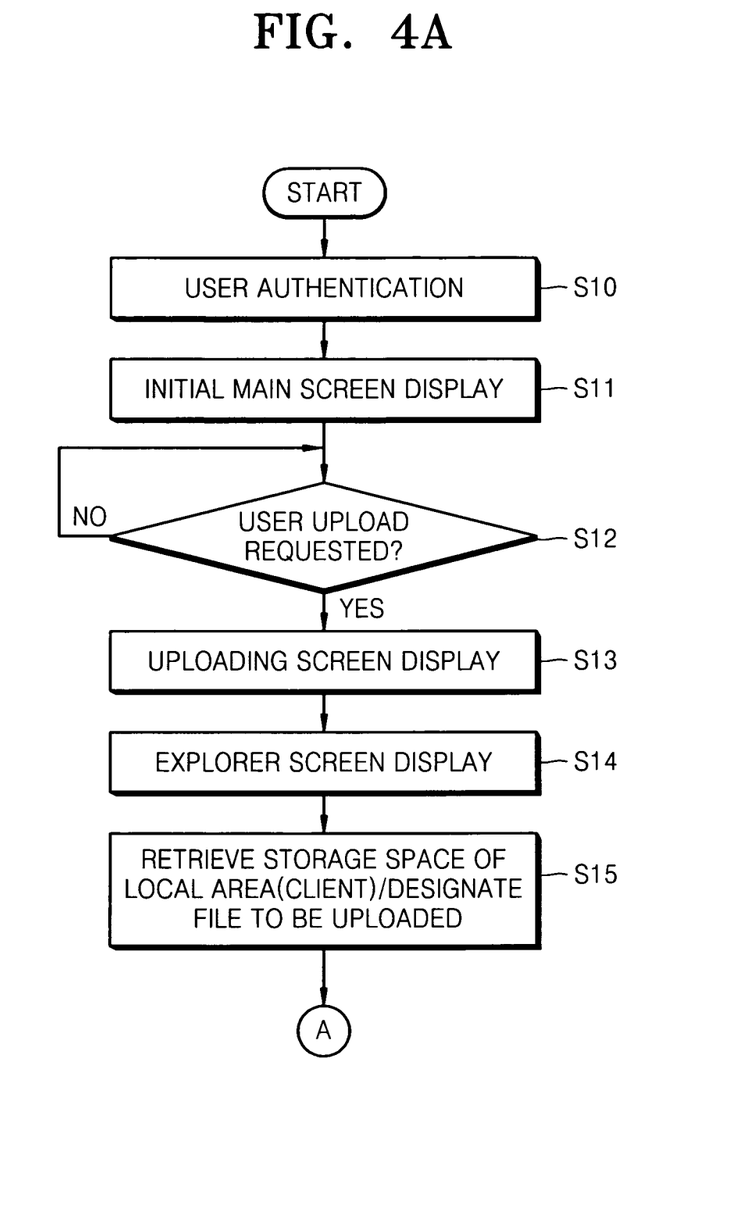
Figure 4B:
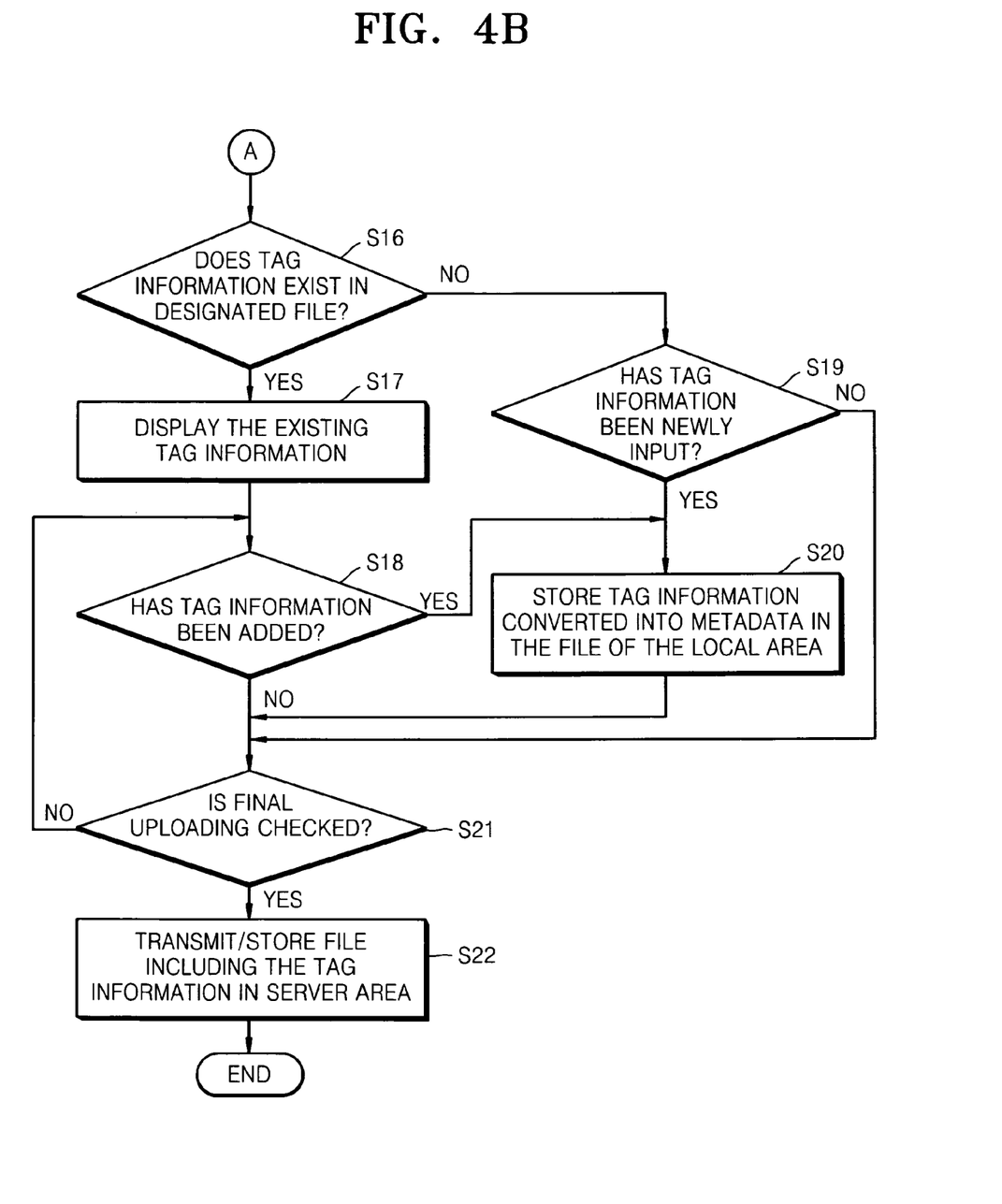

FIG. 4, which is comprised of FIGS. 4A and 4B, is a flowchart illustrating an example of a method of inputting tag information in association with a method of uploading multimedia contents, according to an embodiment of the present invention. FIG. 4 illustrates an example of a method of inputting tag information when contents stored in the storage space 140 of the client terminal 100 are uploaded on the web, using the client-server system of FIG. 2, according to an embodiment of the present invention.

First, the web server 200 checks member information used for user authentication such as user accounts, passwords, and the like from the client terminal 100 connected through the communication network such as the Internet (operation S10) and transmits data used to construct an initial main screen (operation S11). Next, when an upload request signal of the user is received from the main screen implemented at the client terminal 100 (operation S12), the web server 200 provides a web page as illustrated in FIG. 3 as a graphic interface for file upload in response to the upload request signal (operation S13). Next, when a click signal for an icon "search" on the web page is detected, the client terminal 100 provides an explorer screen showing a hierarchical folder structure of the storage space 140 of the client terminal 100 from a root structure to an individual file in each folder (operation S14). The user browses a plurality of folders through the explorer screen and selects a file to be uploaded (operation S15), and as a result of the selecting, a name of the file to be uploaded (ex, A.jpg, B.jpg) is displayed in a rectangular window on the web page.

In addition, the client terminal 100 or the web server 200 determines whether or not tag information has been added to the file to be uploaded (S16). According to a result of the determining, the client terminal 100 extracts metadata from the corresponding file or from the storage space 140 of the client terminal 100 and displays existing tag information (ex, "travel France Paris") on the web page (operation S17). Thereafter, when a click signal for the icon "ADD TAG" on the web page is detected (operation S18), the client terminal 100 converts a text (ex, "FRIEND FRANCE") recorded in the input window into metadata with a predetermined data format, and stores the metadata in the storage space 140, thereby updating the existing metadata (operation S20).

According to a result of determining whether or not the tag information exists in operation S16, when it is determined that the tag information does not exist and new input of tag information is detected (operation S19), the client terminal 100 converts the input tag information to generate and store new metadata in the storage space 140 (operation S20). According to a final manipulation signal for the upload icon of the user (operation S21), the client terminal 100 transmits the file to be uploaded and the web server 200 stores the file received from the client terminal 100 area storage space of the web server 200 (operation S22). Here, the tag information provided from the user may be transmitted in the type of metadata stored in the file to be uploaded or transmitted in another type of metadata separated from the file to be uploaded.

According to the current embodiment of the present invention, the client terminal 100 storing the file to be uploaded stores the metadata including the tag information provided from the user in the storage space 140 of the client terminal 100. More specifically, the client terminal 100 stores the metadata including the tag information in a designated data field in the corresponding file or in a database separated from the corresponding file. The client terminal 100 generates and stores metadata having a predetermined format from the text in the input window at the local area individually from the web server 200 or instead of the web server 200 and may transmit the metadata to the web server 200 in the network.

According to the embodiment illustrated in FIG. 4, after the tag information provided from the user is converted into metadata by the client terminal 100 (operation S20), the tag information is transmitted to the web server 200 in the network (operation S22). However, the scope of the present invention is not limited thereto. For example, after the tag information is converted into the metadata by the web server 200, the tag information is transmitted to the client terminal 100 at the local area.

Figure 5:
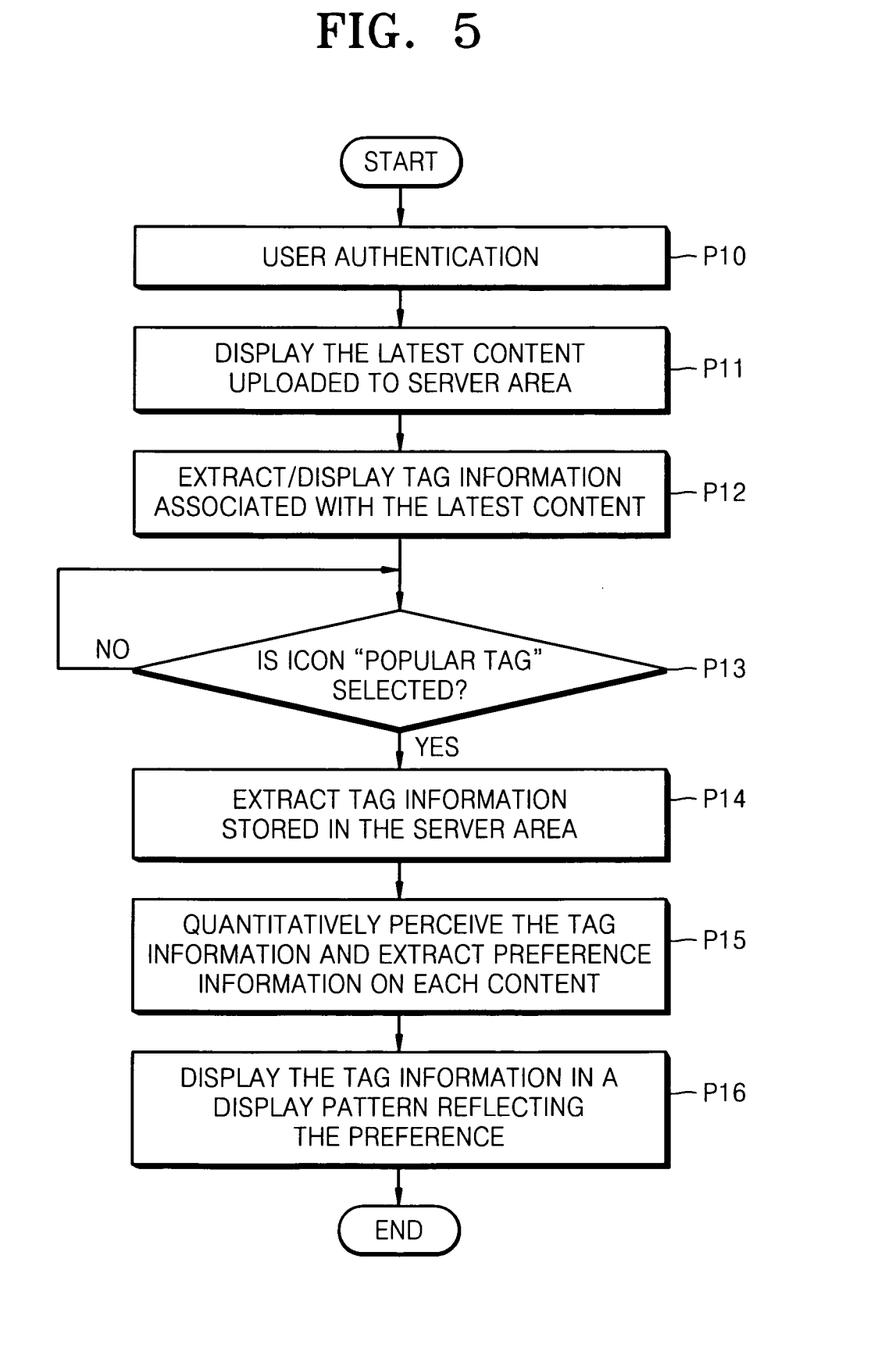
FIG. 5 is a flowchart of an example of a series of operations including providing summary information on the latest multimedia contents lately uploaded to authenticated users and providing "popular information" for providing popular information on a set of contents uploaded on the web in real time on the basis of tag information provided from a number of users who share the contents through a communication network, according to an embodiment of the present invention.

FIG. 5 is a flowchart of an example of a series of operations including providing summary information on the latest multimedia contents lately uploaded to authenticated users and providing "popular information" for providing popular information on a set of contents uploaded on the web in real time on the basis of tag information provided from a number of users who share the contents through a communication network, according to an embodiment of the present invention. In other words, FIG. 5 is a flowchart of an example of a series of operations including providing information on the latest contents uploaded on the web and providing users' popularity information on contents, using the client-server system of FIG. 2, according to an embodiment of the present invention.

First, the web server 200, which checks member information such as user accounts, passwords, and the like provided from the client terminal 100 at the local area and performs user authentication, provides and displays data about the latest contents uploaded on the web so far from the last visit of the authenticated user on the user screen at the local area (operations P10 and P11). Here, the web server 200 extracts/transmits tag information on the latest contents and displays the tag information on the user screen showing a corresponding content (operation P12). More specifically, the web server 200 extracts tag information from the latest content files or extracts tag information from a dedicated database where metadata is accumulated to provide the tag information to the client terminal 100.

Operations after operation P13 described later provide the "popularity information" function of providing popular information on contents uploaded on the web in real-time, on the basis of the tag information provided from a number of users who share contents through the communication network. Specifically, when a click signal for an icon "popular information" is detected (operation P13), the tag information stored in a storage space of the web server 200 is extracted (operation P14), the tag information associated with the same contents is quantitatively perceived, and a mathematical function is applied thereto, so that the information on preferences of the contents, which is represented as numerical values, is extracted (operation P15). In addition, data for constructing the web page along with the tag information is transmitted to the client terminal 100 so as to enable the tag information on the contents to be displayed on the user screen at the local area (operation P16). Here, the data transmitted to the client terminal 100 may include information on a ranking order of the tag information and/or a text size of the tag information such that the tag information is displayed in a pattern reflecting the preference of the contents.

Accordingly, in the method of processing tag information and the client-server system using the method according to the embodiment of the present invention, in order to manage multimedia contents at a local area and on a web connected to the local area through a communication network, tag information which provides summary information on a subject on an individual content, base information for user search, and additional information associated with a corresponding content is managed at the local area in addition to on the web, thus providing a user environment in which the tag information can be applied in a useable way at the local area, and the tag information is added to the multimedia contents at the local area. Therefore, it becomes possible to avoid the necessity of separately inputting tag information each time the contents are uploaded.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of processing tag information, comprising:
    displaying a web page for identifying media contents to be uploaded on a screen of a client terminal, the web page served to the client terminal by a web server through a communication network;
    modifying tag information corresponding to the identified media contents to be uploaded through the web page according to a user input;
    converting the modified tag information into metadata through the web page;
    storing the metadata comprising the converted modified tag information in a local storage of the client terminal; and
    providing the metadata comprising the converted modified tag information to a web server through the web page.

2. The method of claim 1, wherein the storing the metadata in the local storage comprises storing the metadata in a designated data field of a corresponding media contents file, or forming a relationship between the metadata and the corresponding media contents file to store the metadata in an additional database which is separated from the media contents file.

3. The method of claim 1, wherein the provided metadata can be stored in the web server through the web page.

4. A method of processing tag information, comprising:
    displaying a web page for designating media contents to be uploaded on a screen of a client terminal, the web page served to the client terminal by a web server through a communication network;
    displaying tag information extracted from the designated media contents in addition to a name or an image of the designated media contents on the web page if the tag information exists for the designated media contents;
    adding new tag information to the media contents through the web page according to a user input;
    converting the added tag information into metadata using the web page;
    storing the metadata comprising the converted added tar information in a local storage of the client terminal; and
    providing the metadata comprising the converted added tag information to a storage of the web server.

5. The method of claim 4, wherein the storing the metadata in the local storage comprises storing the metadata in a designated data field of a corresponding media contents file, or forming a relationship between the metadata and the corresponding media contents file to store the metadata in an additional database which is separated from the media contents file.

6. The method of claim 4, wherein the provided metadata can be stored in the storage of the web server through the web page.

7. A client-server system having a client terminal and a web server which are connected to each other through a communication network, the client terminal comprising:
   a screen,
   a local storage area,
   a client application module which displays a web page served by the web server through the communication network for designating media contents to be uploaded on the screen of the client terminal and transmits media contents to be uploaded from the local storage area to the web server, and
   a client metadata processing module that stores tag information input through the web page in the local storage area as metadata comprising the tag information input through the web page; and
   the web server comprising:
   a server application module which receives the media contents uploaded from the client terminal to store the media contents in the server area, and
   a server metadata processing module that stores the tag information input through the web page in the server area as metadata comprising the tar information input through the web page.

8. The system of claim 7, wherein one of the client metadata processing module and the server metadata processing module converts the tag information input through the web page into metadata and transmits the metadata to the other one so that the transmitted metadata is stored in the other one.

9. The system of claim 7, wherein the client metadata processing module stores the tag information in a designated data field of a corresponding media contents file, or forms a relationship between the tag information and the corresponding media contents file to store the tag information in an additional database separated from the media contents file.

10. The system of claim 7, wherein the server metadata processing module stores the tag information in a designated data field of a corresponding media contents file, or forms a relationship between the tag information and the corresponding media contents file to store the tag information in an additional database separated from the media contents file.

11. A method for processing tag information associated with a media file, wherein the media file is stored on a client device, the method comprising:
   providing access through a communication network to a server including a web application configured to identify a media file to be uploaded and to modify a metadata field of the identified media file stored on the client device with corresponding metadata;
   receiving at the client device a web page from the web application; using a web browser to display the web page at the client device and to modify tag information in the metadata field according to a user input through the web page, the tag information corresponding to the identified media file;
   updating the metadata using the web application based on the modified tag information in the metadata field;
   storing the updated metadata based on the modified tag information in a local storage of the client device; and
   uploading the updated metadata based on the modified tag information to the server using the web page.

12. The method of claim 11, further comprising associating the uploaded metadata and the web application with a user account.

13. The method of claim 11, further comprising prompting a user to enter data at the client device to modify the metadata field of the media file stored on the client device.

* * * * *

UNITED STATES PATENT AND TRADEMARK OFFICE
CERTIFICATE OF CORRECTION

PATENT NO. : 8,700,672 B2  
APPLICATION NO. : 12/287739  
DATED : April 15, 2014  
INVENTOR(S) : Sung-cheol Bae Page 1 of 1

It is certified that error appears in the above-identified patent and that said Letters Patent is hereby corrected as shown below:

IN THE CLAIMS:

In Claim 4, Column 10, line 57, replace "the converted added tar" with -- the converted added tag --

In Claim 7, Column 11, line 25, replace "the tar information" with -- the tag information --

Signed and Sealed this  
Second Day of September, 2014

Michelle K. Lee  
*Deputy Director of the United States Patent and Trademark Office*